United States Patent
Kang

(10) Patent No.: US 9,092,104 B2
(45) Date of Patent: Jul. 28, 2015

(54) FLEXIBLE TOUCH SCREEN PANEL

(71) Applicant: SAMSUNG DISPLAY CO., LTD., Yongin, Gyunggi-Do (KR)

(72) Inventor: Sung-Ku Kang, Yongin (KR)

(73) Assignee: SAMSUNG DISPLAY CO., LTD., Yongin (KR)

( * ) Notice: Subject to any disclaimer, the term of this patent is extended or adjusted under 35 U.S.C. 154(b) by 181 days.

(21) Appl. No.: 13/890,166

(22) Filed: May 8, 2013

(65) Prior Publication Data

US 2014/0218630 A1    Aug. 7, 2014

(30) Foreign Application Priority Data

Feb. 5, 2013  (KR) ......................... 10-2013-0012892

(51) Int. Cl.
  *G02F 1/1335*  (2006.01)
  *G02F 1/1345*  (2006.01)
  *G02F 1/1333*  (2006.01)
  *G06F 3/044*   (2006.01)

(52) U.S. Cl.
  CPC ...... *G06F 3/044* (2013.01); *G06F 2203/04103* (2013.01); *G06F 2203/04111* (2013.01)

(58) Field of Classification Search
  CPC ................. G02F 1/13338; G02F 2001/13312; G02F 1/13452; G02F 1/1345; G02F 1/13054; G02F 1/133; G02F 1/133305; G02F 1/133351; G06F 3/0412; G06F 3/045; G06F 3/044; H05K 3/361
  USPC .................................... 349/12, 149, 151, 158
  See application file for complete search history.

(56) References Cited

U.S. PATENT DOCUMENTS

| 8,148,744 B2 * | 4/2012 | Niki et al. ................. 257/98 |
| 8,698,003 B2 | 4/2014 | Yoshioka et al. |
| 2011/0242019 A1 * | 10/2011 | Jeong et al. ................. 345/173 |
| 2011/0242141 A1 | 10/2011 | Yamakita et al. |
| 2012/0097424 A1 * | 4/2012 | Jo et al. .................. 174/126.4 |

FOREIGN PATENT DOCUMENTS

| KR | 10-2004-0019352 A | 3/2004 |
| KR | 10-2011-0082626 A | 7/2011 |
| KR | 10-1051448 B1 | 7/2011 |
| KR | 10-2011-0109904 A | 10/2011 |
| KR | 10-2012-0047494 A | 5/2012 |

* cited by examiner

*Primary Examiner* — Mike Qi
(74) *Attorney, Agent, or Firm* — Knobbe Martens Olson & Bear LLP

(57) ABSTRACT

A flexible touch screen panel includes a substrate, first and second sensing electrodes and conductive lines. The substrate includes an active area and a non-active area positioned at the outside of the active area when viewed in a thickness direction thereof. The substrate further includes a first surface and a second surface. The first and second sensing electrodes are formed over the active area of the substrate. The first sensing electrodes are formed to be connected along a first direction, and second sensing electrodes are formed to be connected along a second direction intersecting the first direction. The conductive lines are formed over the non-active area of the substrate, and electrically connect the first and second sensing electrodes to an external driving circuit. In the flexible touch screen panel, one or more concavo-convex patterns are formed on one or both of the first and second surfaces.

12 Claims, 6 Drawing Sheets

FLEXIBLE TOUCH SCREEN PANEL

RELATED APPLICATIONS

This application claims priority to and the benefit of Korean Patent Application No. 10-2013-0012892, filed on Feb. 5, 2013, in the Korean Intellectual Property Office, the entire content of which is incorporated herein by reference.

BACKGROUND

1. Field

An aspect of the present invention relates to a touch screen panel, and more particularly, to a flexible touch screen panel.

2. Description of the Related Art

A touch screen panel is an input device that allows a user's instruction to be input by selecting instruction contents or icons displayed on a screen of a display device or the like with a user's hand or object.

To this end, the touch screen panel is formed on a front face of the display device to convert a contact position into an electrical signal. Here, the user's hand or object is directly in contact with the touch screen panel at the contact position. Accordingly, the instruction content selected at the contact position is input as an input signal to the image display device.

Since such a touch screen panel can be substituted for a separate input device connected to a display device, such as a keyboard or mouse, its application fields have been gradually extended.

Touch screen panels are divided into a resistive overlay touch screen panel, a photosensitive touch screen panel, a capacitive touch screen panel, and the like.

Among these touch screen panels, the capacitive touch screen panel converts a contact position into an electrical signal by sensing a change in capacitance formed between a conductive sensing electrode and an adjacent sensing electrode or ground electrode when a user's hand or object comes in contact with the touch screen panel.

Generally, such a touch screen panel is attached to an outer face of a flat panel display such as a liquid crystal display or organic light emitting display. Therefore, the touch screen panel requires characteristics of high transparency and thin thickness.

A flexible display device has recently been developed for the flexible display device.

Generally, in a touch screen panel, sensing electrodes is implemented using a transparent conductive material such as indium tin oxide (ITO). In a flexible touch screen panel, a crack occurs in the sensing electrode when a bending or folding operation is performed, and therefore, a driving failure may be caused.

Accordingly, it is required to develop a touch screen panel having flexibility, which can secure hardness of a conductive layer without being easily damaged in various bending or folding environments.

SUMMARY

Embodiments provide a flexible touch screen panel capable of securing flexibility and hardness of a conductive layer.

One aspect of the present invention provides a flexible touch screen panel, including: a substrate comprising an active area and a non-active area positioned at the outside of the active area when viewed in a thickness direction thereof, the substrate further comprising a first surface and a second surface facing away from the first surface; first and second sensing electrodes formed over the active area of the substrate, wherein the first sensing electrodes are formed to be connected along a first direction, and wherein the second sensing electrodes are formed to be connected along a second direction intersecting the first direction; and conductive lines formed over the non-active area of the substrate, and connecting the first and second sensing electrodes to an external driving circuit, wherein a concavo-convex pattern is formed on the first surface of the substrate.

The first concavo-convex pattern may comprise concave portions and convex portions alternating with each other and extending along the first direction, and wherein a second concavo-convex pattern may be formed on the second surface, wherein the second concavo-convex pattern may comprise concave portions and convex portions alternating with each other and extending along the first direction.

The first and second concavo-convex patterns may be symmetric with each other.

The convex portions of the first concavo-convex pattern and the concave portions of the second concavo-convex pattern may overlap with each other when viewed in the thickness direction.

The first concavo-convex pattern comprises concave portions and convex portions alternating with each other and extending along the first direction, and wherein a second concavo-convex pattern is formed on the second surface, wherein the second concavo-convex pattern comprises concave portions and convex portions alternating with each other and extending along the second direction.

The first sensing electrodes may be formed in the concave portions of the first concavo-convex patterns.

The second sensing electrodes may be formed in the concave portions of the second concavo-convex patterns.

The first and second sensing electrodes may be formed over the first surface of the substrate.

The flexible touch screen panel may further include a plurality of first connectors, each of which electrically connects two immediately neighboring first sensing electrodes, and a plurality of second connectors, each of which connects two immediately neighboring second sensing electrodes.

The first and second sensing electrodes and the first and second connectors may be formed of a transparent electrode material.

The flexible touch screen panel may further include an insulation layer formed between the first connectors and the second connectors.

The substrate may be a thin film substrate formed of at least one material selected from the group consisting of polyethylene terephthalate (PET), polycarbonate (PC), acryl, polymethyl methacrylate (PMMA), triacetyl cellulose (TAC), polyether sulfone (PES) and polyimide (PI).

As described above, according to the present invention, one of more concavo-convex patterns are formed on one or both of surfaces of a substrate, so that the flexible touch screen panel can be easily bent by a small force applied thereto. Accordingly, it is possible to prevent plastic deformation and minimize damage of a conductive layer.

Particularly, concavo-convex patterns are formed on both surfaces of the substrate, or sensing patterns are formed in concave portions of the concavo-convex patterns, thereby improving flexibility.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

Figure 1:
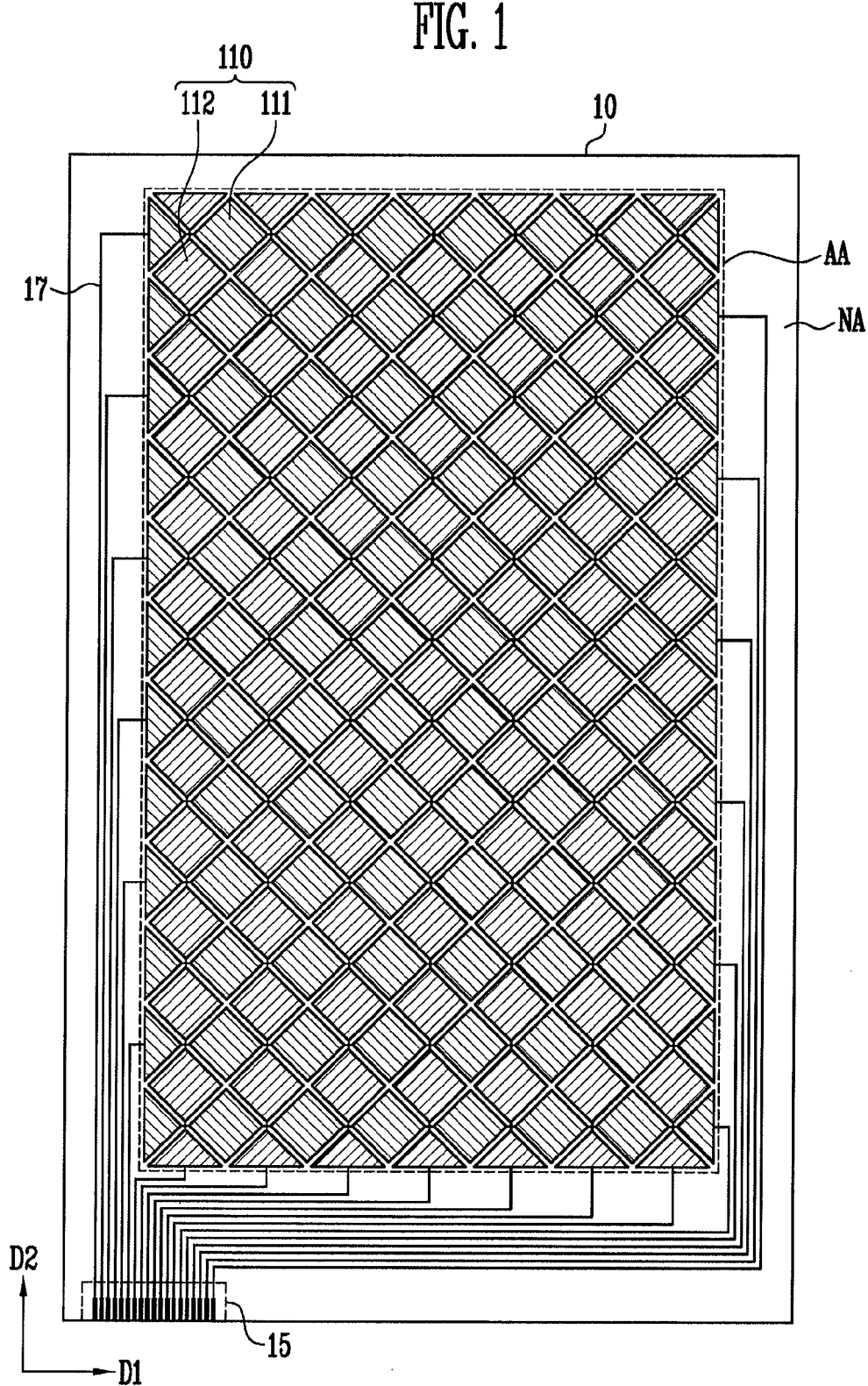
FIG. 1 is a plan view schematically showing an example of a flexible touch screen panel.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. In addition, when an element is referred to as being "on" another element, it can be directly on the other element or be indirectly on the other element with one or more intervening elements interposed therebetween. Also, when an element is referred to as being "connected to" another element, it can be directly connected to the other element or be indirectly connected to the other element with one or more intervening elements interposed therebetween. Hereinafter, like reference numerals refer to like elements.

FIG. 1 is a plan view schematically showing an example of a flexible touch screen panel.

Referring to FIG. 1, the flexible touch screen panel includes a substrate 10 divided into an active area AA and a non-active area NA when viewed in a thickness direction thereof, sensing electrodes formed on the active area AA of the substrate 10, and outer conductive lines 17 formed on the non-active area NA of the substrate 10 so as to connect the sensing electrodes 110 to an external driving circuit (not shown) through a pad portion 15.

The substrate 10 may be divided into the active area AA overlapping with an image display area and on which the sensing electrodes 110 for sensing a touch input are formed, and the non-active area NA positioned at the outside of the active area AA and on which the outer lines 17 are formed.

The substrate 10 is implemented using a material having flexibility, transparency and high thermal and chemical resistance. For example, the substrate 10 may be a thin film substrate formed of at least one material selected from the group consisting of polyethylene terephthalate (PET), polycarbonate (PC), acryl, polymethyl methacrylate (PMMA), triacetyl cellulose (TAC), polyether sulfone (PES) and polyimide (PI).

The sensing electrodes 110 are distributed and arranged on the active area AA of the substrate 10, and include first sensing electrodes 111 and second sensing electrodes 112, electrically connected along different directions.

In one embodiment, the first and second sensing electrodes 111 and 112 may be formed on any one surface of the substrate 10. In another embodiment, the first and second sensing electrodes 111 and 112 may be respectively formed on both surfaces of the substrate 10 with the substrate 10 interposed therebetween.

The first and second sensing electrodes 111 and 112 may be formed of a transparent electrode material such as indium tin oxide (ITO) so that light can be transmitted therethrough. In embodiments, the first sensing electrodes 111 are arranged in rows and aligned along a first direction D1. The second sensing electrodes 112 are arranged in columns and aligned along a first direction D1. In an embodiment, the first sensing electrodes 111 and the second sensing electrodes 112 may form an array.

The sensing electrodes 110 will be described in detail later with reference to FIG. 2.

The outer conductive lines 17 are used to connect the first sensing electrodes 111 to the external driving circuit and to connect the second sensing electrodes 112 to the external driving circuit. For example, some of the outer lines 17 are electrically connected to the first sensing electrodes 111, and each of such outer lines is connected to some of the first sensing electrodes aligned in one of the rows. Similarly, some of the outer lines 17 are electrically connected to the second sensing electrodes 112, and each of such outer lines is connected to some of the second sensing electrodes aligned in one of the columns. Thus, the first and second sensing electrodes 111 and 112 are connected to the external driving circuit such as a position detecting circuit through the pad portion 15.

The outer lines 17 are arranged on the non-active area NA at the outside of the touch screen panel while avoiding the active area AA on which an image is displayed. Since the material of the outer lines is selected in a wide range, the outer lines 17 may be formed of not only a transparent electrode material used to form the sensing electrodes but also a low-resistance metallic material such as molybdenum (Mo), silver (Ag), titanium (Ti), copper (Cu), aluminum (Al) or Mo/Al/Mo.

The touch screen panel described above is a capacitive touch screen panel. If a contact object such as a user's finger or stylus pen comes in contact with the touch screen panel, a change in capacitance caused by a contact position is transferred from the sensing electrodes 110 to the driving circuit via the outer lines 17 and the pad portion 15. Then, the change in capacitance is converted into an electrical signal by X and Y input processing circuits (not shown), thereby detecting the contact position.

Figure 2:
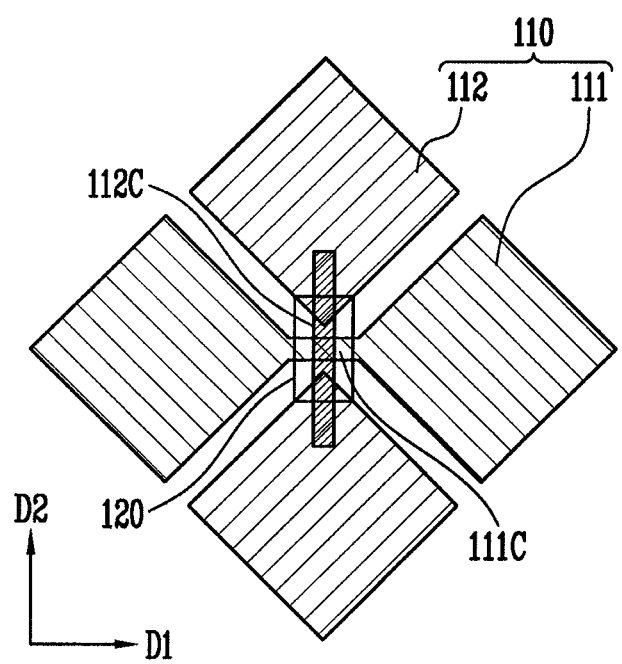
FIG. 2 is a partial enlarged view showing sensing electrodes of the flexible touch screen panel shown in FIG. 1.

FIG. 2 is a partial enlarged view showing sensing electrodes of the flexible touch screen panel shown in FIG. 1.

For convenience of illustration, a partial region of the sensing electrodes 110 shown in FIG. 1 is enlarged in FIG. 2. However, an actual touch screen panel has a structure in which the structure shown in FIG. 2 is repetitively disposed on the substrate 10.

Referring to FIG. 2, the flexible touch screen panel according to this embodiment may include first sensing electrodes 111, second sensing electrodes 112, first connectors 111C, second connectors 112C and an insulation layer 120.

The first sensing electrodes 111 are formed to be electrically connected along the first direction D1, and the second sensing electrodes 112 are distributed and arranged between the first sensing electrodes 111 so as not to overlap with the first sensing electrodes 111. The second sensing electrodes 112 are formed to be electrically connected along the second direction D2 intersecting the first direction D1.

For example, the first sensing electrodes 111 may be connected along a row direction (horizontal direction) so as to be connected to each outer line 17 for each row line, and the second sensing electrodes 112 may be connected along a column direction (vertical direction) so as to be connected to each outer line 17 for each column line.

Here, the first and second sensing electrodes 111 and 112 may be made of the same material. The first and second sensing electrodes 111 and 112 may be arranged in the same diamond shape in the same layer.

In one embodiment, the sensing electrodes 110 may have a stripe shape, and the material, shape and arrangement of the sensing electrodes 110 may have various modifications.

The first connectors 111C connect the first sensing electrodes 111 to each other along the first direction D1, and the second connectors 112C connect the second sensing electrodes 112 to each other along the second direction D2.

Specifically, the first connectors 111C are formed as patterns directly connected to each other in the same layer as the first sensing electrodes 111, and the second connectors 112C have patterns separated from the second sensing electrodes 112. The second connectors 112C may connect the second sensing electrodes 112 for each line along the second direction D2 while being electrically connected to the second sensing electrodes 112 at upper and lower portions of the second sensing electrodes 112.

In one embodiment, the first connectors 111C may be formed, together with the sensing electrodes 110, of a transparent electrode material, and the second connectors 112C may be formed of a low-resistance opaque metallic material.

In a case where the first connectors 111C are formed of a transparent electrode material, the first sensing electrodes 111 and the first connectors 111C are integrally patterned from a patterning process of the transparent electrode material, thereby simplifying the process.

The second connectors 112C may be formed of the transparent electrode material such as the sensing electrodes and the connectors or may be formed of the low-resistance opaque metallic material. The width, thickness or length of the second connectors 112C may be adjusted so that the visibility of the second connectors 112C can be prevented.

In a case where the second connectors 112C are formed of a low-resistance opaque metallic material, the second connectors 112 are simultaneously formed with the outer lines 17 in a process of forming the outer lines 17 arranged on the non-active area NA, thereby further simplifying the process. That is, the second connectors 112C may be formed of the same material in the same layer as the outer lines 17.

In this case, the width of the second connectors 112C is limited so that the visibility of the second connectors 112C can be prevented. Therefore, the width of the second connectors 112C may be formed narrower than that of the first connectors 111C formed of the transparent electrode material.

In one embodiment, the second connectors 112C may be designed to be inclined in a diagonal direction so that the visibility of the second connectors 112C can be effectively prevented.

Meanwhile, the insulation layer 120 may be formed between the first and second connectors 111C and 112C.

In one embodiment, the insulation layer 120 may be partially disposed between the first and second connectors 111C and 112C of which insulation properties are necessarily secured. In another embodiment, the insulation layer 120 may be formed on the entire active area AA so as to entirely cover the sensing electrodes 110.

Additionally, a protective layer (not shown) may be further formed entirely on both surfaces of the touch screen panel so as to protect the patterns formed on the substrate 10 according to design structures.

As described above, the flexible touch screen panel has a structure in which the sensing electrodes 110 and the connectors 111C and 112C connecting the sensing electrodes 110 to each other are formed on the substrate 10 having flexibility.

However, when the flexible touch screen panel is bent or folded, a partial crack or disconnection occurs in the sensing electrodes 110 and the connectors 111C and 112C, which may cause a driving failure.

Accordingly, embodiments of the present invention are conceived to minimize the driving failure of the touch screen panel due to damage of the sensing electrodes 110 and the connectors 111C and 112C. In embodiments of the present invention, one or more concavo-convex patterns are formed on at least one surface of the substrate 10.

The concavo-convex patterns will be described in detail with reference to FIGS. 3A to 3D.

FIGS. 3A to 3D are partial sectional views showing various embodiments of the substrate shown in FIG. 1.

Figure 3A:
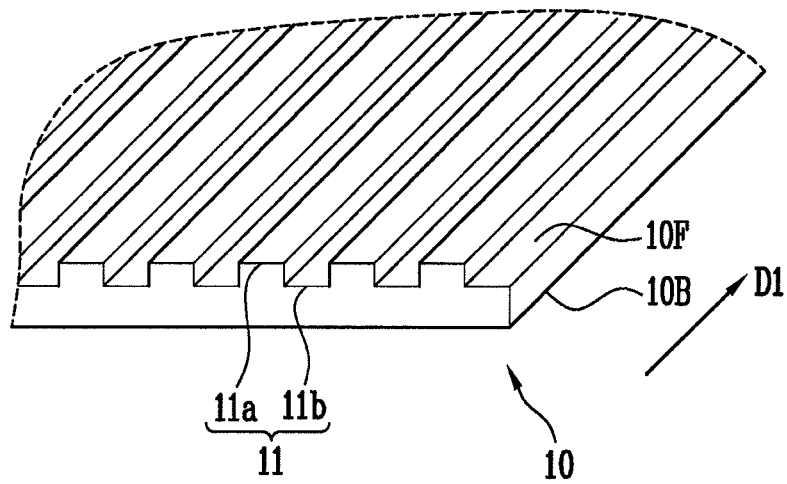
FIGS. 3A to 3D are partial sectional views showing various embodiments of a substrate shown in FIG. 1.

Referring to FIG. 3A, the substrate 10 according to this embodiment has a concavo-convex pattern 11 formed on a first surface 10F thereof.

The concavo-convex pattern 11 may be configured with convex portions 11a which are relatively protruded to form ridges and concave portions 11b which are relatively recessed to form trench grooves. The convex portions 11a and the concave portions 11b extend along the first direction D1.

The width, height and shape of the concavo-convex pattern 11 may have various modifications as those skilled in the art desire, and the present invention is not limited thereto.

The concavo-convex pattern 11 may be entirely formed on the substrate 10, or may be locally formed on a partial area including the active area AA.

As a method for forming the concavo-convex pattern 11, the concavo-convex pattern 11 may be patterned by an exposure method using a photo sensitive dry film, or may be patterned by a physical dry etching method or chemical wet etching method.

Figure 3B:
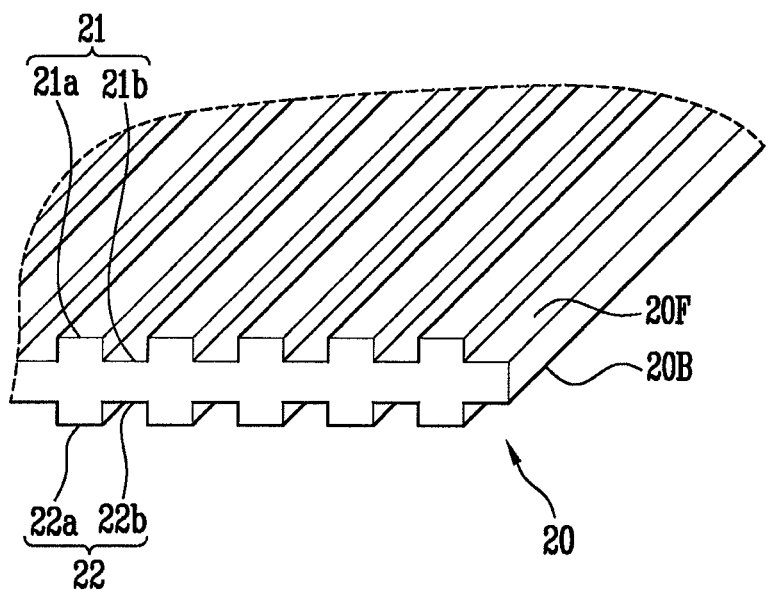

Referring to FIG. 3B, the substrate 20 according to this embodiment has a first concavo-convex pattern 21 on a first surface 20F thereof and a second concavo-convex pattern 22 formed on a second surface 20B opposite to the first surface 20F thereof. The convex portions 21a and 22a and the concave portions 21b and 22b extend along the first direction D1.

That is, the first and second concavo-convex patterns 21 and 22 having the same pattern are respectively formed on both the surfaces of the substrate 20.

Here, the first and second concavo-convex patterns 21 and 22 may be disposed to be symmetric with each other about the substrate 10.

Figure 3C:
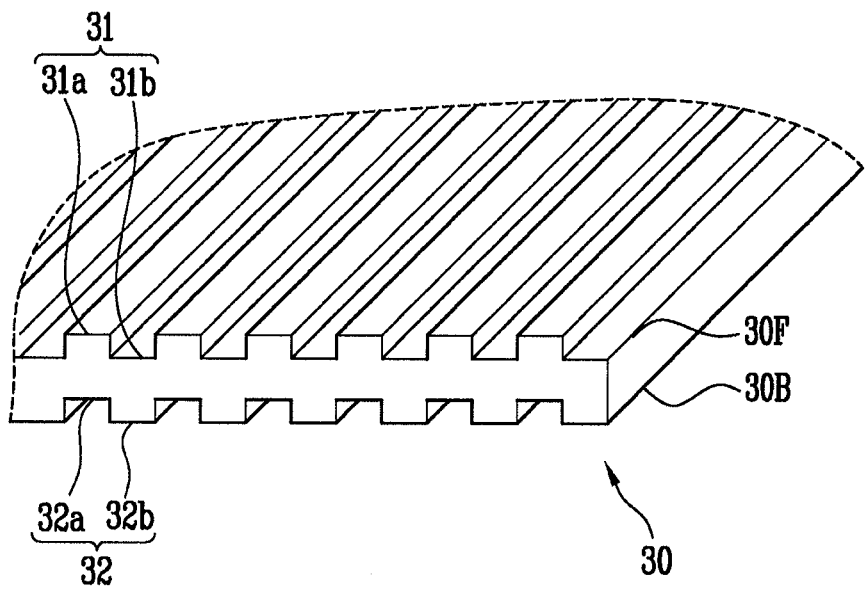

Referring to FIG. 3C, the substrate 30 according to this embodiment has first and second concavo-convex patterns 31 and 32 with different patterns, which are respectively formed on both surfaces thereof.

The first and second concavo-convex patterns 31 and 32 may be disposed so that concave and convex portions overlap with each other about the substrate 30.

Specifically, convex portions 31a of the first concavo-convex pattern 31 overlap with concave portions 32b of the second concavo-convex pattern 32, and concave portions 31b of the first concavo-convex pattern 31 overlap with convex portions 32a of the second concavo-convex pattern 32.

Figure 3D:
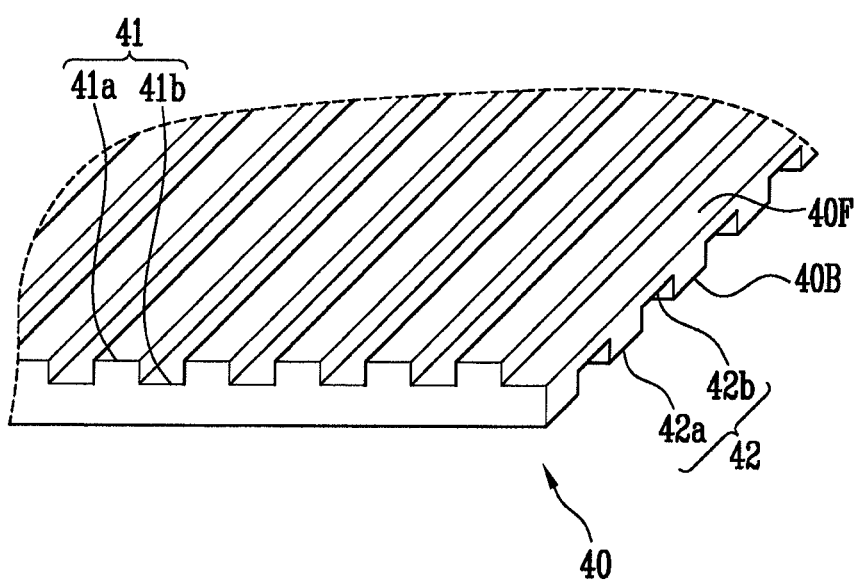

Referring to FIG. 3D, the substrate 40 according to this embodiment has first and second concavo-convex patterns 41 and 42 respectively patterned in different directions on both surfaces thereof.

Specifically, the first concavo-convex pattern 41 are formed on a first surface 40F of the substrate 40, and the second concavo-convex pattern 42 are formed D2 on a second surface 40B of the substrate 40. The convex portions 41a and the concave portions 41b extend along the first direction D1.

The convex portions 42a and the concave portions 42b extend along the second direction D2.

That is, the first and second concavo-convex patterns 41 and 42 may be formed in directions perpendicular to each other.

Figure 4:
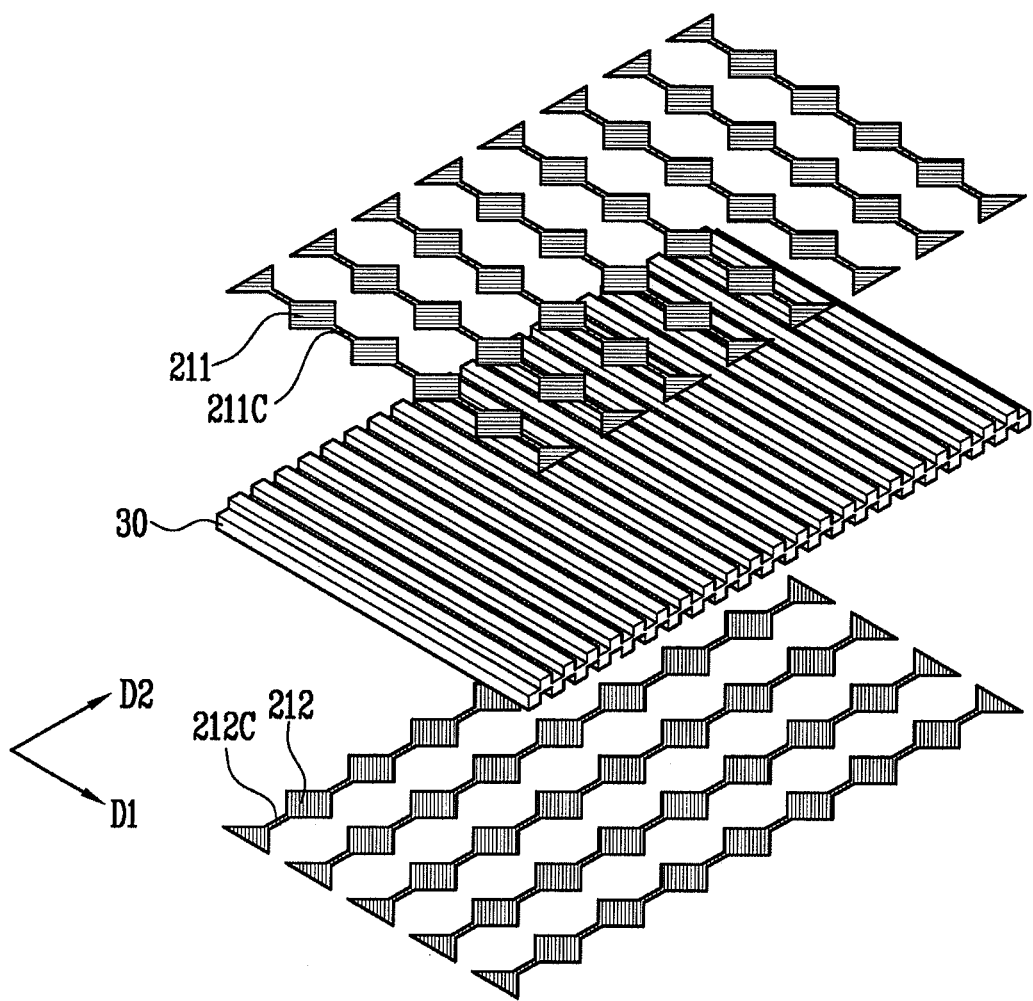
FIGS. 4 and 5 are perspective views showing flexible touch screen panels according to other embodiments of the present invention.
Figure 5:
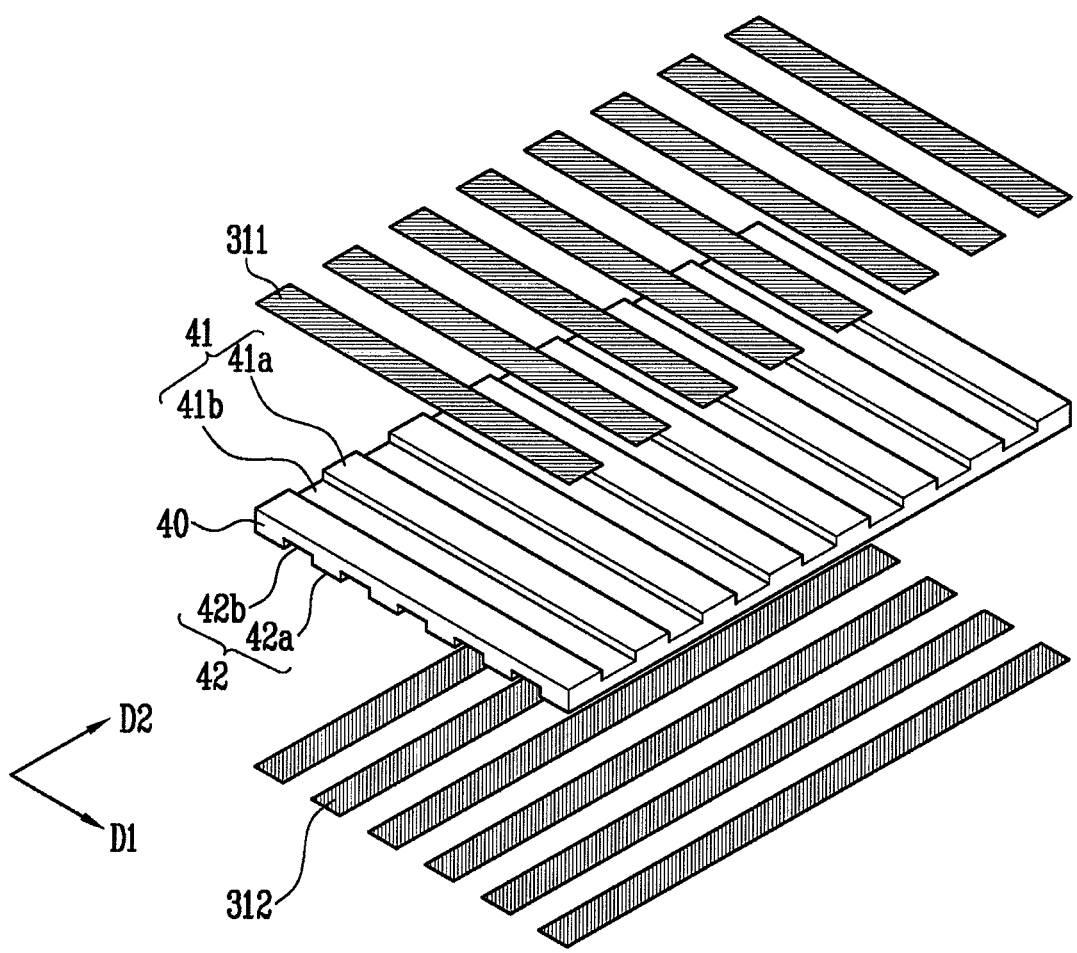

FIGS. 4 and 5 are perspective views showing flexible touch screen panels according to other embodiments of the present invention.

In these embodiments, components identical to those of the aforementioned embodiment are designated by like reference numerals, and descriptions overlapping with those of the aforementioned embodiment will be omitted.

Referring to FIG. 4, the flexible touch screen panel according to this embodiment includes a substrate 30 having first and second concavo-convex patterns 31 and 32 with different patterns, which are respectively formed on both surfaces thereof, first sensing electrodes 211 formed on a first surface 3OF of the substrate 30, and second sensing electrodes 212 formed on a second surface 30B of the substrate 30.

Specifically, the first and second sensing electrodes 211 and 212 are respectively formed on both the surfaces of the substrate 30. The first sensing electrodes 211 may be formed to be electrically connected along the first direction D1, and the second sensing electrodes 212 may be formed to be electrically connected along the second direction D2.

Referring to FIG. 5, the flexible touch screen panel according to this embodiment includes a substrate 40 having first and second concavo-convex patterns 41 and 42 patterned in different directions, which are respectively formed on both surfaces thereof, first sensing electrodes 311 formed on a first surface 40F of the substrate 40, and second sensing electrodes 312 formed on a second surface 40B of the substrate 40.

Specifically, the first and second sensing electrodes 311 and 312 may have stripe shapes extended in different directions. The first sensing electrodes 311 may be formed in concave portions 41b of the first concavo-convex pattern 41, and the second sensing electrodes 312 may be formed in concave portions 42b of the second concavo-convex pattern 42.

In one embodiment, the width of the concave portions and height of the convex portions of the concavo-convex pattern 41 may be substantially identical to or slightly greater than the width and the height of the sensing electrodes 311 so that the sensing electrodes 311 can be accommodated in the concave portions 41b and 42b. In one embodiment, the width of the concave portions and height of the convex portions of the concavo-convex pattern 42 may be substantially identical to or slightly greater than the width and the height of the sensing electrodes 312 so that the sensing electrodes 312 can be accommodated in the concave portions 41b and 42b.

As described above, according to embodiments of the present invention, one or more concavo-convex patterns are formed on at least one surface of a substrate, so that the flexible touch screen panel can be easily bent by a small force applied thereto. Accordingly, it is possible to prevent plastic deformation and minimize damage of a conductive layer.

Particularly, concavo-convex patterns are formed on both surfaces of the substrate, or sensing patterns are formed in concave portions of the concavo-convex patterns, thereby improving flexibility.

While embodiments of the present invention have been described, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A flexible touch screen panel, comprising:
   a substrate comprising an active area and a non-active area positioned at the outside of the active area when viewed in a thickness direction thereof, the substrate further comprising a first surface and a second surface facing away from the first surface;
   first and second sensing electrodes formed over the active area of the substrate, wherein the first sensing electrodes are formed to be connected along a first direction, and wherein the second sensing electrodes are formed to be connected along a second direction intersecting the first direction; and
   conductive lines formed over the non-active area of the substrate, and electrically connecting the first and second sensing electrodes to an external driving circuit,
   wherein a first concavo-convex pattern is formed on the first surface of the substrate.

2. The flexible touch screen panel of claim 1, wherein the first concavo-convex pattern comprises concave portions and convex portions alternating with each other and extending along the first direction, and wherein a second concavo-convex pattern is formed on the second surface, wherein the second concavo-convex pattern comprises concave portions and convex portions alternating with each other and extending along the first direction.

3. The flexible touch screen panel of claim 2, wherein the first and second concavo-convex patterns are symmetric with each other.

4. The flexible touch screen panel of claim 2, wherein the convex portions of the first concavo-convex pattern and the concave portions of the second concavo-convex pattern overlap with each other when viewed in the thickness direction.

5. The flexible touch screen panel of claim 1, wherein the first concavo-convex pattern comprises concave portions and convex portions alternating with each other and extending along the first direction, and wherein a second concavo-convex pattern is formed on the second surface, wherein the second concavo-convex pattern comprises concave portions and convex portions alternating with each other and extending along the second direction.

6. The flexible touch screen panel of claim 5, wherein the first sensing electrodes are formed in the concave portions of the first concavo-convex pattern.

7. The flexible touch screen panel of claim 6, wherein the second sensing electrodes are formed in the concave portions of the second concavo-convex pattern.

8. The flexible touch screen panel of claim 1, wherein the first and second sensing electrodes are formed over the first surface of the substrate.

9. The flexible touch screen panel of claim 1, further comprising a plurality of first connectors, each of which electrically connects two immediately neighboring first sensing electrodes, and a plurality of second connectors, each of which connects two immediately neighboring second sensing electrodes.

10. The flexible touch screen panel of claim 9, wherein the first and second sensing electrodes and the first and second connectors are formed of a transparent electrode material.

11. The flexible touch screen panel of claim 1, further comprising an insulation layer formed between the first connectors and the second connectors.

12. The flexible touch screen panel of claim 1, wherein the substrate is a thin film substrate formed of at least one material selected from the group consisting of polyethylene terephthalate (PET), polycarbonate (PC), acryl, polymethyl methacrylate (PMMA), triacetyl cellulose (TAC), polyether sulfone (PES) and polyimide (PI).

* * * * *